No. 724,295. PATENTED MAR. 31, 1903.
L. JOHNSTONE.
PNEUMATIC TIRE COVER.
APPLICATION FILED APR. 7, 1902.
NO MODEL. 3 SHEETS—SHEET 1.
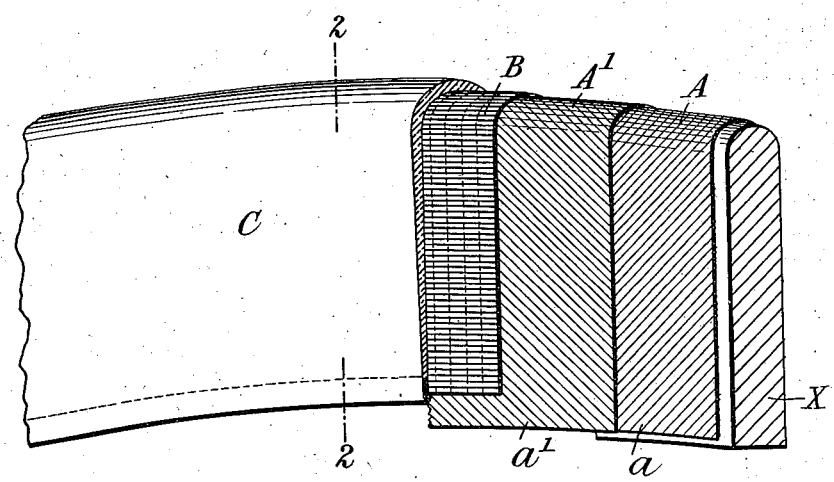
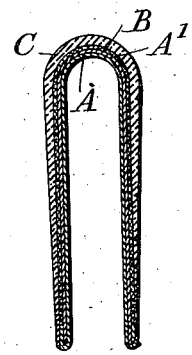
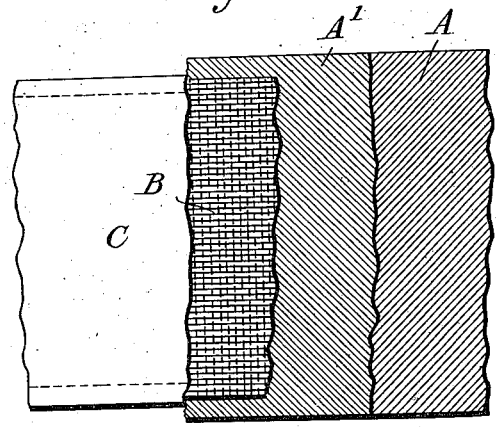
Witnesses.
Inventor.
Lewis Johnstone,
by Wilkinson & Fisher,
Attorneys.

No. 724,295. PATENTED MAR. 31, 1903.
L. JOHNSTONE.
PNEUMATIC TIRE COVER.
APPLICATION FILED APR. 7, 1902.
NO MODEL. 3 SHEETS—SHEET 2.
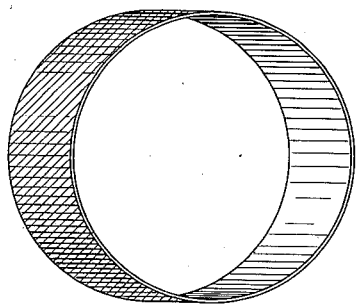
Fig. 3.$^a$
Fig. 5.
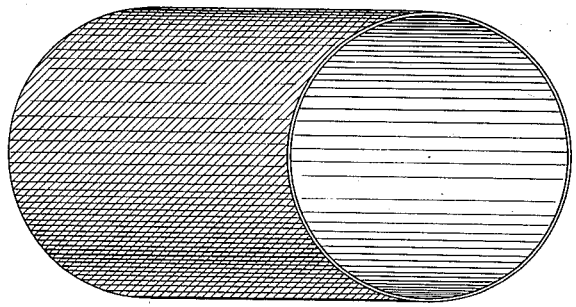
Fig. 11.
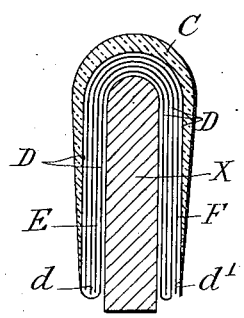
Fig. 12.
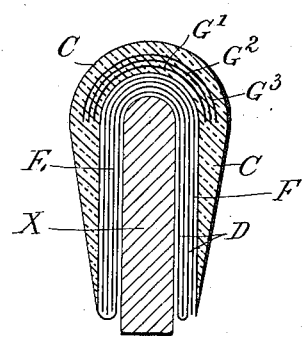
Witnesses.
Inventor:
Lewis Johnstone,
by Wilkinson & Fisher,
Attorneys.

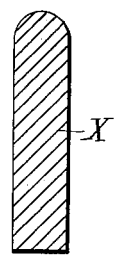
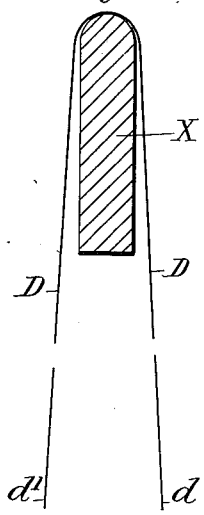
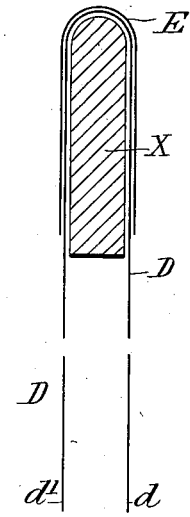
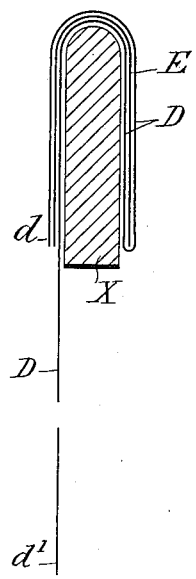
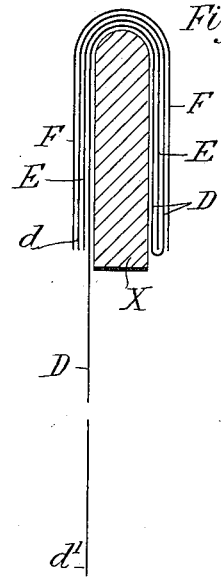
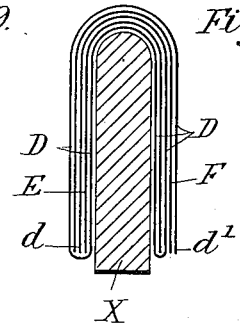

UNITED STATES PATENT OFFICE.

LEWIS JOHNSTONE, OF PRESTWICH, ENGLAND, ASSIGNOR TO THE RADAX PNEUMATIC TYRE COMPANY, LIMITED, OF WARRINGTON, ENGLAND.

PNEUMATIC-TIRE COVER.

SPECIFICATION forming part of Letters Patent No. 724,295, dated March 31, 1903.

Application filed April 7, 1902. Serial No. 101,813. (No model.)

*To all whom it may concern:*

Be it known that I, LEWIS JOHNSTONE, consulting engineer, a subject of the King of Great Britain, residing at 46 Gardner road, Prestwich, in the county of Lancaster, England, have invented certain new and useful Improvements in or Relating to Pneumatic-Tire Covers, of which the following is a specification.

This invention relates to pneumatic-tire covers, and has for its object to produce a pneumatic-tire cover of great durability and resilience which can be easily and economically constructed and which is especially adapted for motor-car tires, as well as cycle-tires or other vehicle-wheels.

In United States Letters Patent dated June 12, 1900, Nos. 651,743 and 651,745, there are described method and means of manufacturing covers for pneumatic tires from a curved woven fabric and in United States Letters Patent, dated June 12, 1900, No. 651,744, there is described a loom for manufacturing such curved woven fabric, and according to my present invention I employ such curved woven fabric in combination and arranged to act in conjunction with "bias fabric" (which latter, as is well known, is usually formed of one or two or more layers of any suitable woven fabric cut on the bias, such as is commonly employed in the manufacture of covers for pneumatic tires for cycles, &c.) in suchwise that the tire-cover thus produced will when inflated hold itself in position on the concave rim of a wheel adapted to receive same without the addition of wires in the edges or any other inextensible edge or any beaded or thickened edge to clench in the rim or any other attachment.

My invention therefore comprises an endless band or ring of bias fabric, one or more layers of curved fabric of the aforesaid character and of a width equal to the full width of the cover to be made, and an outside band of rubber or equivalent forming the tread or exterior wearing-surface of the tire, all combined and formed into a tire-cover and arranged to act as hereinafter more fully described, and finally pointed out in the claims.

In the accompanying drawings I have illustrated in Figures 1 to 3 a light tire-cover made according to my present invention and suitable for bicycles or the like purposes, while in Figs. 4 to 12 I have illustrated a heavier tire made according to my present invention and suitable for motor-cars or the like purposes. Fig. 1 is a perspective view of a mandrel, showing part of a tire-cover thereon made according to my present invention, such tire-cover being partly in section, so as to show the position, arrangement, and construction of the different layers of material forming the cover. Fig. 2 is a cross-sectional view on the line 2 2, Fig. 1, omitting the mandrel. Fig. 3 is a plan view, on a reduced scale, of Fig. 1 with the tire-cover removed from the mandrel and laid out flat. Fig. 3ª is a perspective view of the bias band made up into a ring. Fig. 4 is a cross-sectional view of a suitable mandrel on which tire-covers may be made according to the present invention, consisting of a ring—such, for instance, as illustrated in United States Letters Patent No. 669,837. Figs. 5 to 12 show the means employed and the progressive steps in the manufacture of a motor-tire cover according to the present invention.

Referring to Figs. 1 to 3, A and A' are the two layers of lightly-wefted fabric cut on the bias and laid together in opposing directions in the usual manner employed in the manufacture of covers for cycle-tires and forming together what is commonly known as the "bias band," such bias band being formed into an endless band or ring, as shown in Fig. 3ª. B is curved woven fabric of the well-known character, as aforesaid, which curved woven fabric B may or may not have stretch removed therefrom before being built into the tire. C is the rubber strip forming the outer surface or tread of the cover. X is the mandrel. The bias band A A' is placed on the mandrel under suitable tension, this being advantageously done by first forming the bias band into an endless ring (see Fig. 3ª) rather less in diameter than the diameter of the mandrel X on which the tire-cover is to be made and then stretching such endless band A A' onto said mandrel, the tension under which said band is placed advantageously being such that the edges $a\,a'$ of said bias band will be drawn in against the sides of the mandrel without puckering. Next the curved woven fabric B (which may advantageously be lightly wefted) is placed over said bias band A A' on the mandrel, said curved fabric B advantageously being solutioned to the bias band A A', said curved woven fabric B being wound on or laid onto the mandrel under suitable tension and the ends of said fabric B being brought together and secured in position in any suitable manner advantageously by rubber solution and in suchwise as to form a level or practically level joint. This curved woven fabric B may advantageously be laid (under tension) onto the bias band A A' on the mandrel X by means of a machine such as set forth in United States Letters Patent, dated March 12, 1901, No. 669,837. Next the band or strip of rubber C is laid over the curved woven fabric B, same being solutioned together, and the tire-cover is then complete, and the mandrel is then collapsed and the finished cover removed. If desired, however, the foregoing tire-cover may be solutioned together with a vulcanizing solution and the outside strip C be formed of vulcanizing rubber, and the tire-cover thus constructed while still on the mandrel (either with or without being placed in a mold) is then vulcanized in the known or any suitable manner. Tires thus made will when inflated retain themselves in position in any suitable concave rim without the assistance of any wires, beads, or any other attachments or fastenings to the rim.

Referring now to Figs. 5 to 12, the bias band (formed of two or more layers of bias fabric oppositely disposed in the known manner, as previously described with reference to Figs. 1 to 3) is formed of much greater width than usual. For instance, for a motor-car tire of three inches diameter for a twenty-eight-inch wheel the bias fabric D would be about twenty-seven inches in width across from the edge $d$ to the edge $d'$, this bias fabric D of this great width being formed into an endless band or ring, as shown in Fig. 5, the diameter of which is less than the diameter of the mandrel X, and said ring or bias fabric D is then placed under tension on the mandrel X by stretching said fabric over said mandrel, as shown in Fig. 6. Next a layer (or more than one layer) of curved fabric E is placed over said bias fabric D, as shown in Fig. 7, in a similar manner to that desired, with reference to the curved fabric C in Figs. 1 to 3, said curved fabric E being solutioned to that part of said bias band D inclosed or covered by said curved fabric E and said band D being advantageously wound under tension onto said bias band D by means of a machine such as that shown in the aforesaid United States Patent No. 669,837. Next, as shown in Fig. 8, one edge $d$ of the bias band D is turned back over the mandrel, so as to envelop the layer of curved fabric E, to which same is solutioned. Next, as shown in Fig. 9, another and separate layer (or more than one layer) of curved woven fabric F is laid over the various layers of fabric last described with reference to Fig. 8, said layer of curved fabric F being solutioned to the layers beneath same and wound thereon, as before described with reference to the layer E. Next, as shown in Fig. 10, the edge $d'$ of the bias fabric D is laid over the curved fabric F (and the other layers) on the mandrel X into the position as shown in Fig. 10 and solutioned to said other layers beneath same. Over all I now place the outer rubber strip or tread C of the usual or any suitable type, as shown in Fig. 11, or for making a still stronger or stouter tire, especially suitable for heavy motor-car purposes, I may before applying the outer strip or tread C to the layers of fabric shown in Fig. 10 wind one or more narrower bands or layers of curved woven fabric over the crown of Fig. 10—for instance, three layers $G'\,G^2\,G^3$ of curved woven fabric, as shown in Fig. 12, and then over all place the outer rubber strip or tread C. (See Fig. 12.)

In the manufacture of such covers for motor-car purposes, as hereinbefore described with reference to Figs. 5 to 12, it will in all cases not only be advantageous but desirable to employ a vulcanizing solution on and between the various layers and use vulcanizing-rubber for the outer strip or tread C, and then vulcanize the whole cover, and this may very advantageously be effected by placing the tire-cover while still on a mandrel in a mold and vulcanize same, or such cover may be vulcanized on the mandrel in the open— i. e., without the employment of any mold. Thin sheet-rubber strips or bands (not shown) may be laid in between all or any of the various layers forming the tire-cover, as aforesaid, in addition to the vulcanizing solution employed, and the fabric employed for the aforesaid various layers should advantageously be of such an open character as to freely permit the rubber or vulcanizing solution, or both, to pass between the various threads forming the fabrics employed, so as to thoroughly permeate all through said tire-cover.

The bias band is rubbered in the usual way before being formed into the ring on the mandrel in either of the foregoing manners, and the curved woven fabric employed (either for making the bicycle-tire, as hereinbefore described with reference to Figs. 1 to 3, or for making heavier tires for motor-car or the like purposes, as hereinbefore described with reference to Figs. 4 to 12) is or may advantageously be previously rubbered before being placed on the mandrel.

The essential feature of my present invention consists in employing in conjunction with bias fabric a curved woven fabric of a width equal to the full width of the cover to be made; but it is not necessary or essential to retain such full width of curved woven fabric after same has once been placed in position in the cover to be made. For instance, I may cut out or otherwise remove the crown or central part of said curved woven fabric after the latter has been placed in position on the mandrel, but always so as to leave a suitable width of said curved woven fabric along each edge of the tire-cover, as a tire-cover thus constructed will under inflation hold itself onto the rim of the wheel, notwithstanding the removal of the central portion of said curved woven fabric.

Having now described my invention, what I claim as new, and desire to secure by Letters Patent of the United States, is—

1. In a cover for pneumatic tires; the combination with a bias fabric and an outside rubber band, of a layer of curved woven fabric of the full width of the cover to be made, substantially as and for the purposes hereinbefore described.

2. In a cover for pneumatic tires; the combination with a bias fabric and an outside rubber band, of a plurality of layers of curved woven fabric of the full width of the cover to be made, substantially as and for the purposes hereinbefore described.

3. In a cover for pneumatic tires; the combination with a plurality of layers of bias fabric and an outside rubber band, of a plurality of layers of curved woven fabric of the full width of the cover to be made substantially as and for the purposes hereinbefore described.

4. In a cover for pneumatic tires; the combination with a bias fabric and an outside rubber band, of a layer of curved woven fabric, which latter—at the moment when same is laid into the cover—is of the full width of the cover to be made, substantially as and for the purposes hereinbefore described.

5. In a cover for pneumatic tires; the combination with a bias fabric and an outside rubber band, of a plurality of layers of curved woven fabric which latter—at the moment when same is laid into the cover—is of the full width of the cover to be made, substantially as and for the purposes hereinbefore described.

6. In a cover for pneumatic tires; the combination with a plurality of layers of bias fabric and an outside rubber band, of a plurality of layers of curved woven fabric which latter—at the moment when same is laid into the cover—is of the full width of the cover to be made, substantially as and for the purposes hereinbefore described.

In witness whereof I have hereunto set my hand in presence of two witnesses.

LEWIS JOHNSTONE.

Witnesses:
  HENRY BIRKBECK,
  H. D. JAMESON.